(12) United States Patent (10) Patent No.: US 11,361,658 B1
Zhao et al. (45) Date of Patent: Jun. 14, 2022

(54) EDGE COMPUTING-BASED METHOD FOR FINE DETERMINATION OF URBAN TRAFFIC STATE

(71) Applicant: SHANGHAI SEARI INTELLIGENT SYSTEM CO., LTD., Shanghai (CN)

(72) Inventors: Yi Zhao, Shanghai (CN); Yifan Wang, Shanghai (CN); Bin Huan, Shanghai (CN); Yi Zhu, Shanghai (CN); Xuechen Yang, Shanghai (CN); Xuexue Wang, Shanghai (CN)

(73) Assignee: SHANGHAI SEARI INTELLIGENT SYSTEM CO., LTD., Shanghai (CN)

( * ) Notice: Subject to any disclaimer, the term of this patent is extended or adjusted under 35 U.S.C. 154(b) by 0 days.

(21) Appl. No.: 17/429,632

(22) PCT Filed: Apr. 13, 2020

(86) PCT No.: PCT/CN2020/084559
§ 371 (c)(1),
(2) Date: Nov. 15, 2021

(87) PCT Pub. No.: WO2021/036278
PCT Pub. Date: Mar. 4, 2021

(30) Foreign Application Priority Data

Aug. 26, 2019 (CN) .......................... 201910788675.X (51) Int. Cl.
*G08G 1/01* (2006.01)
*G06N 5/04* (2006.01)
*G08G 1/052* (2006.01)

(52) U.S. Cl.
CPC .............. *G08G 1/0133* (2013.01); *G06N 5/04* (2013.01); *G08G 1/0116* (2013.01);
(Continued)

(58) Field of Classification Search
CPC .. G08G 1/0133; G08G 1/0116; G08G 1/0129; G08G 1/0145; G08G 1/052; G06N 5/04
See application file for complete search history.

(56) References Cited

U.S. PATENT DOCUMENTS

| 6,317,058 B1 * | 11/2001 | Lemelson | .............. G08G 1/087 340/905 |
| 6,317,686 B1 * | 11/2001 | Ran | ...................... G08G 1/0141 73/178 R |

(Continued)

FOREIGN PATENT DOCUMENTS

| CN | 102542818 A | 7/2012 |
| CN | 102592447 A | 7/2012 |

(Continued)

OTHER PUBLICATIONS

GB506047-2011, Code for planning of intersections on urban roads, 2010.

(Continued)

*Primary Examiner* — Luis A Martinez Borrero
(74) *Attorney, Agent, or Firm* — Bayramoglu Law Offices LLC (57) ABSTRACT

An edge computing-based method for fine determination of an urban traffic state includes the following steps: preprocessing lane-level data collected by edge nodes; dividing a complete road segment; computing an average delay per vehicle of a lane by using the edge nodes; inputting the preprocessed and computed data into a fuzzy logic model to determine a lane-level traffic state of an approach region; and based on the characteristic that edge nodes at the intersections can be interconnected, linking upstream and downstream intersection information to compute an average travel speed of a remaining road segment, and determining a traffic state of the remaining road segment.

7 Claims, 2 Drawing Sheets

(52) U.S. Cl.
CPC ......... *G08G 1/0129* (2013.01); *G08G 1/0145* (2013.01); *G08G 1/052* (2013.01)

(56) References Cited

U.S. PATENT DOCUMENTS

| | | | | |
|---|---|---|---|---|
| 6,633,238 | B2* | 10/2003 | Lemelson | G08G 1/0116 340/905 |
| 7,155,376 | B2* | 12/2006 | Yang | G08G 1/0129 701/532 |
| 8,484,002 | B2* | 7/2013 | Yang | G06F 30/20 701/428 |
| 9,123,239 | B2* | 9/2015 | Kurzhanskiy | G08G 1/052 |
| 9,804,756 | B2* | 10/2017 | Massoumi | G09B 29/007 |
| 9,953,113 | B2* | 4/2018 | Yang | G06F 30/20 |
| 10,895,468 | B2* | 1/2021 | Yang | G08G 1/0129 |
| 10,957,188 | B2* | 3/2021 | Johnson | G08G 1/052 |
| 11,301,769 | B2* | 4/2022 | Wu | G08G 1/0125 |
| 2002/0008637 | A1* | 1/2002 | Lemelson | G08G 1/0116 340/907 |
| 2007/0093997 | A1* | 4/2007 | Yang | G06F 30/20 703/8 |
| 2013/0282346 | A1* | 10/2013 | Yang | G06F 30/20 703/8 |
| 2014/0114885 | A1* | 4/2014 | Han | G06N 20/10 706/20 |
| 2014/0222321 | A1* | 8/2014 | Petty | G08G 1/012 701/533 |
| 2015/0095830 | A1* | 4/2015 | Massoumi | G06F 3/0484 715/771 |
| 2015/0206428 | A1* | 7/2015 | Kurzhanskiy | G08G 1/052 701/119 |
| 2019/0310100 | A1* | 10/2019 | Yang | G08G 1/0137 |
| 2019/0311612 | A1* | 10/2019 | Johnson | G08G 1/0112 |
| 2021/0209939 | A1* | 7/2021 | Wang | G06T 7/90 |
| 2022/0083885 | A1* | 3/2022 | Wu | G06N 7/005 |

FOREIGN PATENT DOCUMENTS

| | | |
|---|---|---|
| CN | 104050809 A | 9/2014 |
| CN | 105551250 A | 5/2016 |
| CN | 106803347 A | 6/2017 |
| CN | 108665715 A | 10/2018 |
| CN | 109410577 A | 3/2019 |
| CN | 109544929 A | 3/2019 |
| CN | 109584551 A | 4/2019 |
| CN | 109686082 A | 4/2019 |
| CN | 109871412 A | 6/2019 |
| CN | 110120152 A | 8/2019 |
| CN | 110634287 A | 12/2019 |
| EP | 3502886 A1 | 6/2019 |

OTHER PUBLICATIONS

GAT 994-2017, Specifications for road traffic information release, 2017.

* cited by examiner

FIG. 3

EDGE COMPUTING-BASED METHOD FOR FINE DETERMINATION OF URBAN TRAFFIC STATE

CROSS REFERENCE TO THE RELATED APPLICATIONS

This application is the national phase entry of International Application No. PCT/CN2020/084559, filed on Apr. 13, 2020, which is based upon and claims priority to Chinese Patent Application No. 201910788675.X, filed on Aug. 26, 2019, the entire contents of which are incorporated herein by reference.

TECHNICAL FIELD

The present invention belongs to the field of intelligent traffic, and in particular, relates to an edge computing-based method for fine determination of an urban traffic state.

BACKGROUND

The past several years have witnessed the rapid development of Internet of Things (IoT) technologies. Edge computing, as a new computing model, has attracted more attention and is increasingly being applied in a variety of fields, for example, in the field of intelligent traffic. In the present invention, edge nodes at the intersections compute the state of an urban interrupted traffic flow, and then refine the determined region on this basis, thereby realizing a new edge computing-based method for fine determination of an urban traffic state.

Existing centralized application systems have problems such as low reusability of the intersection devices, independence of the inter-system data, and excessive reliance on the computing capability of the center. To meet the current four major needs including technology upgrade of artificial intelligence, intensive construction of urban development, business efficiency of police on duty, and coordinated development of vehicles and roads, it is highly desirable to improve humanization, refinement, and intelligence of road traffic management.

Edge computing technology brings data collection, storage, and processing at the end close to the data source, which effectively improves operation efficiency of data processing, data security, and real-time interaction with the center. Additionally, the computing characteristics of a local network also ensure that the edge node can operate offline in a stable manner. In practical applications, the devices at each intersection edge node are directly interconnected to complete real-time data collection, directly perform intersection computations locally, and cooperate with a cloud brain to realize an innovative application of edge computing in intelligent traffic. Furthermore, according to the characteristics of an interrupted flow on an urban road, the road segment in the approach region is generally affected deeply by signal lights. It is, therefore, necessary to focus on the traffic state of such road segments. Based on the advantages of multi-source data aggregation of the intersection nodes, the traffic state of the approach region can be distinguished from the state of a current complete road segment to perform lane-level fine determination, which assists the traffic management department in proactively identifying anomalies in the intersection or road segment, thereby providing more efficient and reliable technical support for traffic management and future Internet of vehicles (IoV) services.

SUMMARY

An objective of the present invention is to: realize fine determination of the traffic state of an urban interrupted flow based on the edge computing capability of intersection nodes in combination with the advantages of multi-source data of the intersection nodes, thereby providing more accurate road network information for traffic managers and help them proactively identify the cause of traffic congestion, lane imbalance, and other problems in the road network, while providing better travel services for travelers.

To achieve the above-mentioned objective, the technical solutions of the present invention provide an edge computing-based method for fine determination of an urban traffic state, including the following steps:

step 1: preprocessing lane-level multi-source data collected by edge nodes, and inputting the preprocessed data into a database as input data for a subsequent step;

step 2: dividing a complete road segment between intersections into an approach region and a remaining road segment region;

step 3: computing an average delay per vehicle of each lane by using the computing capability of the edge nodes based on a signal cycle of a current intersection;

step 4: determining input values and output values of a fuzzy logic model, and their respective levels representing different traffic states, inputting the average delay per vehicle of each lane obtained in step 3 as the input values into the fuzzy logic model to perform a computation, and outputting a traffic state of the approach region, where a method for computing the traffic state of the approach region includes the following steps:

step 4.1: performing a cluster analysis on the input values by K-Means clustering based on historical data, to obtain classification indexes of the input values, where the input values are historical average delays per vehicle of each lane, and the classification indexes are levels representing different traffic states;

step 4.2: determining classification indexes of the output values of the fuzzy logic model based on an actual requirement;

step 4.3: determining a membership function for each input value, each output value, and their respective levels representing different traffic states;

step 4.4: designing a fuzzy rule between the input values and the output values; and step 4.5: converting, by using a preset fuzzy logic inference method, a real-time input value into an output value, that is, an eigenvalue of the traffic state, and obtaining the corresponding traffic state of the approach region; and step 5: computing a traffic state of the remaining road segment based on real-time data preprocessed in step 1, where a method for computing the traffic state of the remaining road segment includes the following steps:

step 5.1: establishing a matching relationship between upstream and downstream cross-sections, linking intersection information, and obtaining information of vehicles passing the upstream and downstream cross-sections successively;

step 5.2: computing travel times of all vehicles meeting the requirement in step 5.1 within a signal cycle of a downstream intersection to constitute a set, and computing an average travel time;

step 5.3: computing an approach-level traffic parameter and an intersection determination index based on the computation results obtained in steps 1 and 3;

step 5.4: based on the computation results obtained in step 5.3, computing an average travel time of vehicles passing the approach region within the signal cycle of the downstream intersection; and step 5.5: based on the computation result obtained in step 5.4, computing an average travel time of vehicles passing the remaining road segment within the signal cycle of the downstream intersection, computing an average travel speed based on the length of the remaining road segment, and obtaining a corresponding traffic state.

Preferably, in step 1, the edge nodes at the intersections can perform lane-level data preprocessing on underlying data collected by a plurality of devices integrated in the edge nodes at the intersections, and the data preprocessing includes data quality determination, data repair, and data granularity processing.

Preferably, in step 2, a standard length of the approach region is set to 120 m, and the length of the remaining road segment is 300 m to 600 m based on the length of a standard segment, and can be appropriately divided and adjusted.

Preferably, in step 3, the average delay per vehicle of each lane within the signal cycle C of the current intersection is computed based on the intersection information collected by the edge nodes, and the average delay per vehicle includes:

a critical saturation SC of the lane:

$$SC = 0.67 + \frac{SF * GT}{600}$$

where SF represents a saturation flow of the lane, and GT represents a green time;

an average quantity of queued vehicles left on the lane:

$$LF = \begin{cases} \frac{LC*C}{4}\left[(LS-1) + \sqrt{(LS-1)^2 + \frac{12*(LS-SC)}{LC*C}}\right] \\ \quad\quad\quad\quad\quad\quad\quad\quad 0, LS \leq SC \\ \quad\quad\quad\quad\quad\quad\quad\quad LS > SC \end{cases}$$

where LF represents the average quantity of queued vehicles left on the lane within the signal cycle C of the current intersection, LC represents a lane capacity, and LS represents a lane saturation; and the average delay per vehicle of the lane:

$$LD = \begin{cases} \frac{C*(1-PS)^2}{2*(1-V/SF)}, & LS \leq SC \\ \frac{(1-PS)^2}{2(1-V/SF)} + \frac{LF*LS}{V}, & SC < LS < 1 \\ \frac{RT}{2} + \frac{LF*LS}{V}, & 1 \leq LS \leq 1.15 \\ \frac{RT}{2} + \frac{(LS-1)}{2}*C, & LS > 1.15 \end{cases}$$

where LD represents the average delay per vehicle of each lane within the signal cycle C of the current intersection, PS represents a phase split allocated to the lane, V represents a lane volume within the signal cycle C of the current intersection, and RT represents a phase red time.

Preferably, in step 4, the classification indexes of the input values of the fuzzy logic model are correspondingly adjusted based on historical data collected by each edge node and actual situations of different intersections, to realize a self-learning process of each edge node.

Preferably, in step 4.1, the step of computing the classification indexes of the input values by the K-Means clustering includes the following steps:

step 4.1.1: generating an input data set X and k initial cluster centers, where the input data set X denoted as $\{X_1, X_2, \ldots, X_n\}$ is generated by using 24-hour historical data that is generated at an interval of the signal cycle of the current intersection and preprocessed in step 1, and then partitioned into k clusters denoted as $\{C_1, C_2, \ldots, C_k\}$, and k objects are selected as the initial cluster centers from the data set X and denoted as $\{\mu_1, \mu_2, \ldots, \mu_k\}$, where $1 < k \leq n$;

step 4.1.2: computing a Euclidean distance from each cluster object to each cluster center according to the following formula, and assigning the cluster object to a closest cluster:

$$d_{ij} = \sqrt{\sum_{t=1}^{m} (X_{it} - \mu_{jt})^2}$$

where $d_{ij}$ represents a Euclidean distance from an object $X_i$ to a cluster center $\mu_j$, m represents a quantity of attributes in the data set X, $X_{it}$ represents the $t^{th}$ attribute of the $i^{th}$ object, and $\mu_{jt}$ represents the $t^{th}$ attribute of the $j^{th}$ cluster center, where $1 \leq t \leq m$; and comparing the distance from each object to each cluster center successively, and assigning the object to the cluster whose cluster center is closest;

step 4.1.3: re-computing each cluster center, where an average value of objects in each cluster is computed a new cluster center according to the following formula:

$$\mu'_j = \frac{1}{|C_j|} \sum_{X_i \in C_j} X_i$$

where $\mu_j'$ represents the $j^{th}$ re-computed cluster center, $C_j$ represents the $j^{th}$ cluster, and $|C_j|$ represents a quantity of objects in the $j^{th}$ cluster; and step 4.1.4: determining whether the cluster center has changed, where a sum of the distance from each cluster object to each new cluster center is computed according to the following formula:

$$E = \sum_{j=1}^{k} \sum_{i=1}^{n} \|X_i - \mu'_j\|^2$$

where E represents the sum of the distance from each cluster object to each new cluster center, and is also referred to as a criterion function; steps 4.1.2 to 4.1.4 are repeated until the cluster center does not change, that is, the criterion function converges, and then the iteration ends; and finally, convergent cluster centers are used as the classification indexes of the input values of the fuzzy logic model.

Preferably, in step 5, based on the characteristic that the edge nodes at the intersections can be interconnected, the traffic state of the remaining road segment is determined by linking information collected at the upstream and downstream intersections by the edge nodes in combination with the results obtained in steps 1 to 4.

According to the present invention, the traffic state of an urban interrupted flow can be determined by the edge nodes. In addition, based on the advantages of the multi-source data of the intersection nodes, the present invention innovatively puts forward a method for fine determination of the traffic state of the approach region that is greatly affected by signal control and the traffic state of the remaining road segment region that is greatly affected by the road entrance, the road exit, and illegal vehicle parking. The present invention can be used for traffic management or the like in the field of intelligent traffic to resolve the problem that prior methods for traffic state determination have low refinement, while improving operation efficiency of traffic state determination and system robustness.

DETAILED DESCRIPTION OF THE EMBODIMENTS

The present invention will be described in detail below with reference to the specific embodiments. It should be understood that these embodiments are only intended to illustrate the present invention rather than to limit the scope of the present invention. In addition, it should be understood that those skilled in the art can make various changes and modifications to the present invention after reading the content of the present invention, and these equivalent forms shall also fall within the scope defined by the appended claims of the present invention.

Figure 1:
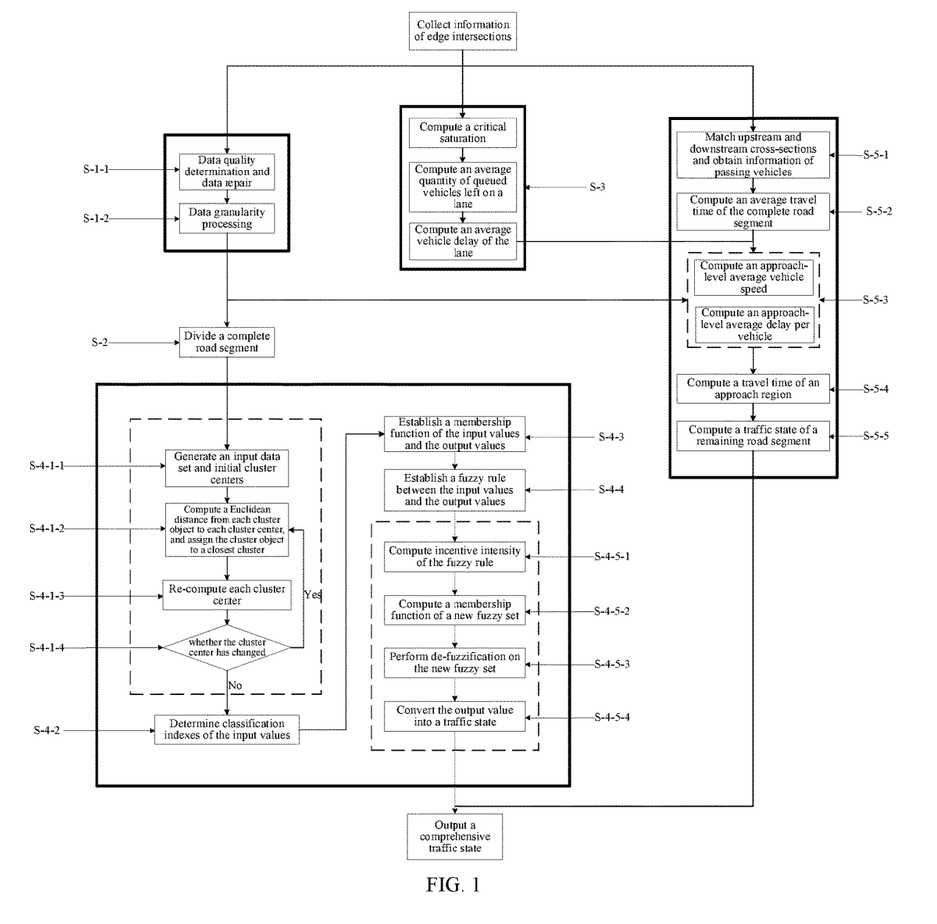
FIG. 1 is a schematic diagram of an edge computing-based method for fine determination of an urban traffic state.
Figure 2:
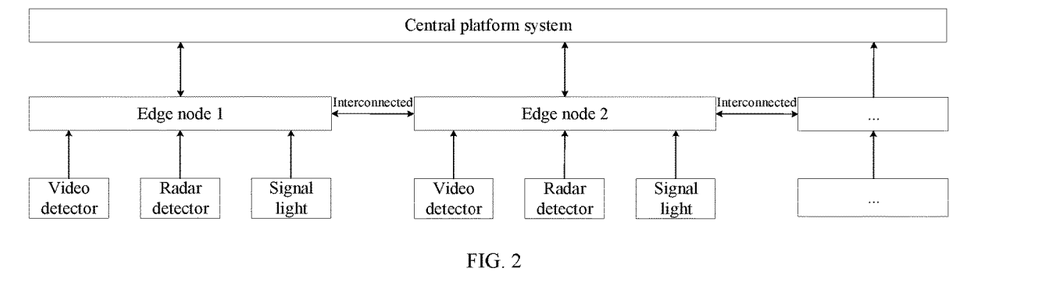
FIG. 2 is a data flow diagram of edge nodes at the intersections.

As shown in FIG. 1 and FIG. 2, an edge computing-based method for fine determination of an urban traffic state includes the following steps.

Step S-1: data collected by edge nodes is preprocessed.

A plurality of data collection devices are integrated in the intersection nodes, including video detectors, radar detectors, signal lights and others. All data can be refined at the lane level. The preprocessing of the data collected by the edge nodes mainly includes data quality determination, data repair, and data granularity processing.

Step S-1-1: data quality determination and data repair.

Preferably, the data quality determination mainly includes: forming a corresponding determination rule by setting upper and lower thresholds of the data and based on temporal and spatial characteristics of traffic parameters. The data repair mainly includes: fusing historical data of lanes and data of adjacent lanes, and finally replacing data having problematic data quality with repaired data.

Step S-1-2: data granularity processing.

After the data quality determination and data repair, underlying data with a granularity of one piece of data per 20 seconds is reasonably processed into lane-level data with a granularity in units of the signal cycle C of a current intersection, and then the lane-level data is input into a database. For example, the lane volumes collected by the video detectors may be processed in an accumulative manner, while the queue length and the average vehicle speed of a lane that are collected by the radar detectors may be processed through arithmetic averaging.

Step S-2: a complete road segment is divided.

The intersection spacing of an urban road is generally 200 m to 1000 m, and becomes greater with the increase of the road hierarchy. However, the length of a standard segment of an urban road is generally 300 m to 600 m. In this case, the refinement degree to which the traffic state is released across the intersections is relatively low, and consequently the traffic management department is usually unable to identify and deal with problems in time.

Figure 3:
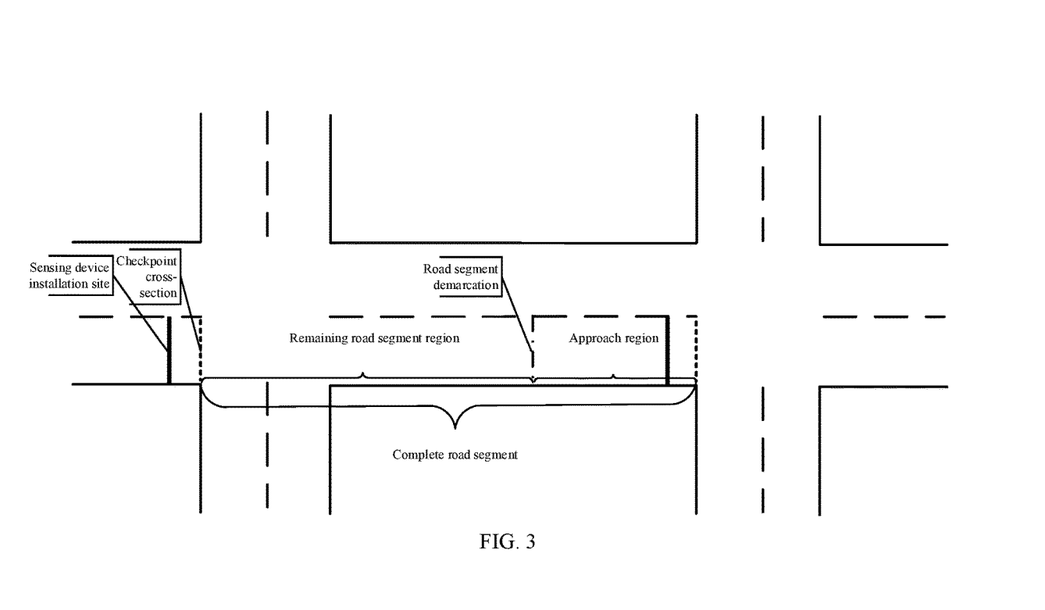
FIG. 3 is a schematic diagram of the division of a typical road segment.

With reference to FIG. 3, one typical complete road segment is bounded by the cross-sections of the upstream and downstream intersections, and is divided into an approach region and a remaining road segment region. According to the *Code for Planning of Intersections on Urban Roads* (GB50647-2011), the range of an intersection shall include a stretching-segment and a stretching transition segment, and then extend 10 m to 20 m outward. By comprehensive consideration, the length of the approach region is generally about 100 m to 150 m, and becomes greater with the increase of the road hierarchy. Based on the detection coverage of node devices at the intersection, the standard length of the approach region is set to 120 m in the present invention. A road segment excluding the approach region in the complete road segment is used as the remaining road segment. The length of the remaining road segment can refer to the length of a standard segment. The remaining road segment can be properly divided if it is too long.

Step S-3: an average delay per vehicle of a lane is computed.

Based on intersection information collected by the edge nodes, an average delay per vehicle of each lane within the signal cycle C (in seconds) of the current intersection is computed according to the following formulas:

(1) a critical saturation is computed according to the following formula:

$$SC = 0.67 + \frac{SF * GT}{600}$$

where, SC represents the critical saturation of the lane, SF represents a saturation flow (in PCU) of the lane, and GT represents a green time (in seconds).

(2) an average quantity of queued vehicles left on the lane is computed according to the following formula:

$$LF = \begin{cases} \frac{LC * C}{4}\left[(LS-1) + \sqrt{(LS-1)^2 + \frac{12*(LS-SC)}{LC*C}}\right], & LS > SC \\ 0, & LS \leq SC \end{cases}$$

where, LF represents the average quantity (in PCU) of queued vehicles left on the lane within the signal cycle C of the current intersection, LC represents a lane capacity (in PCU/hour), C represents the signal cycle of the current intersection, and LS represents a lane saturation.

(3) the average delay per vehicle of the lane is computed according to the following formula:

$$LD = \begin{cases} \dfrac{C*(1-PS)^2}{2*(1-V/SF)}, & LS \le SC \\ \dfrac{(1-PS)^2}{2(1-V/SF)} + \dfrac{LF*LS}{V}, & SC > LS > 1 \\ \dfrac{RT}{2} + \dfrac{LF*LS}{V}, & 1 \le LS \le 1.15 \\ \dfrac{RT}{2} + \dfrac{(LS-1)}{2}*C, & LS > 1.15 \end{cases}$$

where, LD represents the average delay per vehicle (in seconds) of each lane within the signal cycle C of the current intersection, PS represents a phase split allocated to the lane, V represents a lane volume (in PCU) within the signal cycle C of the current intersection, and RT represents a phase red time (in seconds).

Step S-4: the traffic state of the approach region is computed.

In the present invention, the traffic state of the approach region can be refined at the lane level, that is, the traffic state of each lane is displayed separately. The traffic state is computed by using a fuzzy logic algorithm. As an extension to classical binary logic, fuzzy logic is generalized and continuous. The fuzzy logic can be used to simulate the way of thinking of humans. Different from machine learning, the fuzzy logic is another branch of artificial intelligence.

Step S-4-1: classification indexes of input values of a fuzzy logic model are determined.

The input values of the model are generally one or more traffic parameters and determination indexes, such as the average vehicle speed, the queue length, and the average delay per vehicle of a lane. The input values can be adjusted correspondingly based on actual data collected at the intersection by using an algorithm.

In the present invention, the classification indexes of the input values are computed by K-Means clustering, which specifically includes the following steps:

Step S-4-1-1: an input data set X and k initial cluster centers are generated.

Preferably, the input data set X denoted as $\{X_1, X_2, \ldots, X_n\}$ is generated by using 24-hour historical data that is generated at an interval of the signal cycle of the current intersection and preprocessed in step S-1, and then partitioned into k clusters denoted as $\{C_1, C_2, \ldots, C_k\}$. k objects are selected as the initial cluster centers from the data set X and denoted as $\{\mu_1, \mu_2, \ldots, \mu_k\}$, where $1<k\le n$.

Step S-4-1-2: a Euclidean distance from each cluster object to each cluster center is computed according to the following formula, and the cluster object is assigned to a closest cluster:

$$d_{ij} = \sqrt{\sum_{t=1}^{m}(X_{it} - \mu_{jt})^2}$$

where, $d_{ij}$ represents a Euclidean distance from an object $X_i$ to a cluster center $\mu_j$, m represents a quantity of attributes in the data set X, $X_{it}$ represents the $t^{th}$ attribute of the $i^{th}$ object, and $\mu_{jt}$ represents the $t^{th}$ attribute of the $j^{th}$ cluster center, where $1 \le t \le m$.

The distance from each object to each cluster center is compared successively, and the object is assigned to the cluster whose cluster center is closest.

Step S-4-1-3: each cluster center is re-computed.

An average value of objects in each cluster is computed as a new cluster center according to the following formula:

$$\mu'_j = \frac{1}{|C_j|}\sum_{X_i \in C_j} X_i$$

where, $\mu_j'$ represents the $j^{th}$ re-computed cluster center, $C_j$ represents the $j^{th}$ cluster, and $|C_j|$ represents a quantity of objects in the $j^{th}$ cluster.

Step S-4-1-4: it is determined whether the cluster center has changed.

The sum of the distance from each cluster object to each new cluster center is computed according to the following formula:

$$E = \sum_{j=1}^{k}\sum_{i=1}^{n}\|X_i - \mu'_j\|^2$$

where, E represents the sum of the distance from each cluster object to each new cluster center, and is also referred to as a criterion function.

Steps S-4-1-2 to S-4-1-4 are repeated until the cluster center does not change, that is, the criterion function converges, and then the iteration ends. Finally, convergent cluster centers are used as the classification indexes of the input values of the fuzzy logic model.

Step S-4-2: Classification Indexes of Output Values of the Fuzzy Logic Model are Determined.

The output values of the model are eigenvalues of the traffic state, and the classification indexes of the output values can be adjusted and optimized based on an actual requirement.

Preferably, according to the Specifications for Road Traffic Information Release (GAT 994-2017), the traffic state is divided into six levels: smooth, basically smooth, lightly congested, moderately congested, heavily congested, and severely congested.

Step S-4-3: a membership function of the input values and the output values is established.

Based on the classification indexes determined in steps S-4-1 and S-4-2, a corresponding membership function is established for each input value and output value. Common membership functions mainly include a triangular function, a trapezoidal function, a sigmoid function, a Gaussian function and a bell-shaped function.

Preferably, the average delay per vehicle of the lane and the queue length of the lane are used as the input values of the fuzzy logic model, and the eigenvalues of the traffic state are used as the output values of the fuzzy logic model. A two-sided Gaussian function that fits the characteristics of the average delay per vehicle of the lane, the queue length of the lane, and the eigenvalues of the traffic state is selected as the membership function according to the following formula:

$$\mu(x) = \begin{cases} e^{\frac{(x-c_1)^2}{\sigma_1^2}}, & x < c_1 \\ e^{\frac{(x-c_2)^2}{\sigma_2^2}}, & x \ge c_2 \end{cases}$$

where, $\mu(x)$ represents the membership grade of the input value x, $c_1$ and $c_2$ represent center coordinates of peaks on both sides, and $\sigma_1$ and $\sigma_2$ represent standard deviations on both sides. The values of $c_1$, $c_2$, $\sigma_1$, and $\sigma_2$ are determined based on the classification indexes obtained in steps S-4-1 and S-4-2.

Step S-4-4: a fuzzy rule between the input values and the output values is established.

Preferably, experts' experience and knowledge are changed into the form of "if . . . then . . . " by an expert experience method, to further design the fuzzy rule for mapping the input values to the output values. As a basis of fuzzy logic computation, the fuzzy rule merges precise values in a fuzzy domain into each fuzzy subset according to the membership function. In addition, many corrections are needed to obtain optimal system performance.

For example, when the input values are the average delay per vehicle of the lane and the queue length of the lane, and the output values are the traffic state, a fuzzy rule is designed as shown in the following table:

| Average delay per vehicle | Average queue length ||||| 
|---|---|---|---|---|---|
| | Short | Relatively short | General | Relatively Long | long |
| High | Moderately congested | Moderately congested | Heavily congested | Severely congested | Severely congested |
| Relatively high | Lightly congested | Lightly congested | Moderately congested | Heavily congested | Heavily congested |
| General | Basically smooth | Lightly congested | Lightly congested | Moderately congested | Moderately congested |
| Relatively low | Smooth | Basically smooth | Basically smooth | Lightly congested | Moderately congested |
| low | Smooth | Smooth | Smooth | Basically smooth | Lightly congested |

Step S-4-5: the traffic state of the approach region is obtained through fuzzy logic inference.

Preferably, the fuzzy logic inference is performed by using a Mamdani algorithm. To simplify the explanation, the following premise is used as an example to describe the following algorithm steps:

Assuming $A^*, A_1, A_2, \ldots, A_m$ are fuzzy sets in a domain X, $B^*, B_1, B_2, \ldots, B_n$ are fuzzy sets in a domain Y, $C^*, C_1, C_2, \ldots, C_t$ are fuzzy sets in a domain Z, and there are a total of k fuzzy rules in the following forms:

(1) If x is $A_1$ and y is $B_1$, then z is $C_1$
(2) If x is $A_2$ and y is $B_2$, then z is $C_2$
. . . .
(k) If x is $A_m$ and y is $B_n$, then z is $C_t$ When $x=x_0$ and $y=y_0$ (it is assumed that p rules are activated under this condition), a new fuzzy set $C^*$ in the domain Z and a corresponding output value $z_0$ ($x \in X$, $y \in Y$, $z \in Z$) need to be inferred.

Step S-4-5-1: incentive intensity of each rule is computed as follows:

$$\omega_1 = \mu_{A_1}(x_0) \wedge \mu_{B_1}(y_0)$$

$$\omega_2 = \mu_{A_2}(x_0) \wedge \mu_{B_2}(y_0)$$

. . . .

$$\omega_p = \mu_{A_q}(x_0) \wedge \mu_{B_w}(y_0)$$

where, $\omega_1$, $\omega_2$, and $\omega_p$ represent incentive intensity of the activated rules, $\mu_{A_1}(x_0)$, $\mu_{A_2}(x_0)$, and $\mu_{A_q}(x_0)$ represent membership grades of the input value $x_0$ with respect to the fuzzy sets $A_1, A_2, A_q$ ($q \leq m$), respectively, and $\mu_{B_1}(y_0), \mu_{B_2}(y_0)$, and $\mu_{B_w}(y_0)$ represent membership grades of the input value $y_0$ with respect to the fuzzy sets $B_1, B_2, B_w$ ($w \leq n$), respectively.

Step S-4-5-2: a membership function of the new fuzzy set is obtained through fuzzy inference according to the following formula:

$$\mu_{C^*}(Z) = (\omega_1 \wedge \mu_{C_1}(z)) \vee (\omega_2 \wedge \mu_{C_2}(z)) \quad . \quad . \quad . \quad \vee (\omega_p \wedge \mu_{C_p}(z))$$

where, $\mu_{C^*}(z)$ represents the membership function of the new fuzzy set, and $\mu_{C_1}(z)$, $\mu_{C_2}(z)$, and $\mu_{C_p}(z)$ represent membership functions of fuzzy sets $C_1, C_2, C_p$ ($p \leq t$), respectively.

Step S-4-5-3: de-fuzzification on the new fuzzy set.

Preferably, the de-fuzzification is performed by the centroid method. This method has smoother output inference control, and thus can reflect a tiny input change in the output according to the following formula:

$$z_0 = \frac{\int_Z z \cdot \mu_C * (z) \, dz}{\int_Z \mu_C * (z) \, dz}$$

where, $z_0$ represents a precise value obtained after the de-fuzzification, namely, the output value.

Step S-4-5-4: the output value is converted into the traffic state.

Based on the classification indexes of the traffic state obtained in step S-4-2, the output value $z_0$ of step S-4-5-3 is converted into a corresponding traffic state level as the (lane level) traffic state of the approach region.

Step S-5: the traffic state of the remaining road segment is computed.

Step S-5-1: the upstream and downstream cross-sections are matched, and information of passing vehicles is obtained.

When a traffic stream passes a checkpoint cross-section of an intersection and then continues to pass another checkpoint cross-section of an adjacent intersection, the two cross-sections are successively referred to as an upstream cross-section and a downstream cross-section based on a time sequence of the traffic stream passing the two cross-sections. Generally, one downstream cross-section can match one or more upstream cross-sections due to the steering of the vehicle stream.

Based on the above definition, the upstream and downstream checkpoint cross-sections of the intersections are matched to form a complete road segment. In addition, based on the characteristic that the edge nodes at the intersections are interconnected, a set $S = \{P_1, P_2, \ldots, P_r\}$ of license plate information of vehicles successively passing the upstream and downstream checkpoint cross-sections, a set $T_1 = \{t_1, t_2, \ldots, t_r\}$ of times at which the vehicles pass the downstream checkpoint cross-section, and a set $T_2 = \{t'_1, t'_2, \ldots, t'_r\}$ of times at which the vehicles pass the upstream checkpoint cross-section in a certain time range $[T_{min}, T_{max}]$ (in seconds) are obtained.

Step S-5-2: an average travel time of the complete road segment is computed.

The travel times of all vehicles meeting the requirement in step S-5-1 within the signal cycle C of the intersection at which the downstream cross-section is located is computed to constitute a set $T_3 = \{travel\_time_1, travel\_time_2, \ldots, travel\_time_r\}$ according to the following formula:

$$travel\_time = (t_i - t'_i) * 86400, i = 1, 2, \ldots, r$$

where, travel_time$_i$ represents the travel time (in seconds) of the i$^{th}$ vehicle in the set S that passes the upstream and downstream checkpoint cross-sections.

Preferably, the average travel time of all the vehicles in the set T$_3$ that pass the complete road segment is computed by an arithmetic averaging method according to the following formula:

$$T_C = \frac{\sum_{i=1}^{r} \text{travel\_time}_i}{r}$$

where, T$_C$ represents an arithmetic average of all travel times in the set T$_3$, namely, the average travel time (in seconds).

Step S-5-3: an approach-level traffic parameter and an index are computed.

Preferably, an approach-level average vehicle speed and an approach-level average delay per vehicle are computed based on the average vehicle speed of the lane preprocessed in step S-1 and the average delay per vehicle of the lane computed in step S-3 by the arithmetic averaging method according to the following formulas:

(1) the approach-level average vehicle speed is computed according to the following formula:

$$V_E = \frac{\sum_{j=1}^{u} v_j}{u}, j = 1, 2, \ldots, u$$

where, V$_E$ represents the approach-level average vehicle speed (in meters/second), u represents the total quantity of lanes on the downstream checkpoint cross-section, and v$_j$ represents an average vehicle speed (in meters/second) of the j$^{th}$ lane within the cycle C.

(2) the approach-level average delay per vehicle is computed according to the following formula:

$$D_E = \frac{\sum_{j=1}^{u} LD_j}{u}, j = 1, 2, \ldots, u$$

where, D$_E$ represents the approach-level average delay per vehicle (in seconds), u represents the total quantity of lanes on the downstream checkpoint cross-section, and v$_j$ represents an average delay per vehicle (in seconds) of the j$^{th}$ lane within the cycle C.

Step S-5-4: the travel time of the approach region is computed according to the following formula:

$$TT_E = D_E + \frac{L_E}{V_E}$$

where, TT$_E$ represents the travel time (in seconds) of the approach region, and L$_E$ represents the length (in meters) of the approach region.

Step S-5-5: the traffic state of the remaining road segment is computed.

The length of the remaining road segment is computed to obtain an average travel speed according to the following formula:

$$V_L = \frac{L_C - L_E}{T_C - TT_E}$$

where, V$_L$ represents the average travel speed (in meters/second) of the remaining road segment, and LC represents the length (in meters) of the complete road segment between the upstream and downstream checkpoint cross-sections.

Preferably, according to the Specifications for Road Traffic Information Release (GAT 994-2017), the average travel speed V$_L$ is converted into a corresponding traffic state level as the (road segment-level) traffic state of the remaining road segment.

What is claimed is:
1. An edge computing-based method for fine determination of an urban traffic state, comprising the following steps:
  step 1: preprocessing, by at least one processor, lane-level multi-source data collected by edge nodes, and inputting preprocessed data into a database as input data for a subsequent step;
  step 2: dividing, by the at least one processor, a complete road segment between intersections into an approach region and a remaining road segment region;
  step 3: computing, by the at least one processor, an average delay per vehicle of each lane by using a computing capability of the edge nodes based on a signal cycle of a current intersection;
  step 4: determining, by the at least one processor, input values and output values of a fuzzy logic model, and levels of the input values and levels of the output values, wherein the levels of the input values and the levels of the output values represent different traffic states, inputting the average delay per vehicle of the each lane obtained in step 3 into the fuzzy logic model to perform a computation, and outputting a traffic state of the approach region, wherein a method for computing the traffic state of the approach region comprises the following steps:
  step 4.1: performing a cluster analysis on the input values by K-Means clustering based on historical data, to obtain classification indexes of the input values, wherein the input values are historical average delays per vehicle of the each lane, and the classification indexes are levels representing different traffic states;
  step 4.2: determining classification indexes of the output values of the fuzzy logic model based on an actual requirement;
  step 4.3: determining a membership function for the input values, the output values, the levels of the input values and the levels of the input values, wherein the levels of the input values and the levels of the input values represent the different traffic states;
  step 4.4: designing a fuzzy rule between the input values and the output values; and
  step 4.5: converting a real-time input value into an output value by a preset fuzzy logic inference method, wherein the output value is an eigenvalue of the traffic state, and obtaining the traffic state of the approach region corresponding to the eigenvalue; and step 5: computing, by the at least one processor, a traffic state of a remaining road segment based on real-time data preprocessed in step 1, wherein a method for computing the traffic state of the remaining road segment comprises the following steps:

step 5.1: establishing a matching relationship between an upstream cross-section and a downstream cross-section, linking intersection information, and obtaining information of vehicles passing the upstream cross-section and the downstream cross-section successively;

step 5.2: computing travel times of the vehicles meeting a requirement in step 5.1 within a signal cycle of a downstream intersection to constitute a set, and computing an average travel time;

step 5.3: computing an approach-level traffic parameter and an intersection determination index based on computation results obtained in steps 1 and 3;

step 5.4: based on computation results obtained in step 5.3, computing an average travel time of vehicles passing the approach region within the signal cycle of the downstream intersection; and step 5.5: based on a computation result obtained in step 5.4, computing an average travel time of vehicles passing the remaining road segment within the signal cycle of the downstream intersection, computing an average travel speed based on a length of the remaining road segment, and obtaining the traffic state corresponding to the remaining road segment.

2. The edge computing-based method for the fine determination of the urban traffic state according to claim 1, wherein in step 1, the edge nodes at the intersections perform lane-level data preprocessing on underlying data collected by a plurality of devices integrated in the edge nodes at the intersections, and the data preprocessing comprises data quality determination, data repair, and data granularity processing.

3. The edge computing-based method for the fine determination of the urban traffic state according to claim 1, wherein in step 2, a standard length of the approach region is set to 120 m, and the length of the remaining road segment is 300 m to 600 m based on a length of a standard segment, and is appropriately divided and adjusted.

4. The edge computing-based method for the fine determination of the urban traffic state according to claim 1, wherein in step 3, the average delay per vehicle of the each lane within the signal cycle C of the current intersection is computed based on the intersection information collected by the edge nodes, and the average delay per vehicle comprises:

a critical saturation SC of a lane:

$$SC = 0.67 + \frac{SF * GT}{600}$$

wherein SF represents a saturation flow of the lane, and GT represents a green time;

an average quantity of queued vehicles left on the lane:

$$LF = \begin{cases} \frac{LC*C}{4}\left[(LS-1) + \sqrt{(LS-1)^2 + \frac{12*(LS-SC)}{LC*C}}\right] & LS > SC \\ 0, LS \le SC \end{cases}$$

wherein LF represents the average quantity of the queued vehicles left on the lane within the signal cycle C of the current intersection, LC represents a lane capacity, and LS represents a lane saturation; and the average delay per vehicle of the lane:

$$LD = \begin{cases} \frac{C*(1-PS)^2}{2*(1-V/SF)}, & LS \le SC \\ \frac{(1-PS)^2}{2(1-V/SF)} + \frac{LF*LS}{V}, & SC < LS < 1 \\ \frac{RT}{2} + \frac{LF*LS}{V}, & 1 \le LS \le 1.15 \\ \frac{RT}{2} + \frac{(LS-1)}{2}*C, & LS > 1.15 \end{cases}$$

wherein LD represents the average delay per vehicle of the each lane within the signal cycle C of the current intersection, PS represents a phase split allocated to the lane, V represents a lane volume within the signal cycle C of the current intersection, and RT represents a phase red time.

5. The edge computing-based method for the fine determination of the urban traffic state according to claim 1, wherein in step 4, the classification indexes of the input values of the fuzzy logic model are correspondingly adjusted based on historical data collected by the edge nodes and actual situations of different intersections, to implement a self-learning process of the edge nodes.

6. The edge computing-based method for the fine determination of the urban traffic state according to claim 1, wherein in step 4.1, the step of computing the classification indexes of the input values by the K-Means clustering comprises the following steps:

step 4.1.1: generating an input data set X and k initial cluster centers, wherein the input data set X denoted as $\{X_1, X_2, \ldots, X_n\}$ is generated by using 24-hour historical data, wherein the 24-hour historical data is generated at an interval of the signal cycle of the current intersection and preprocessed in step 1, the input data set X is partitioned into k clusters denoted as $\{C_1, C_2, \ldots, C_k\}$, and k cluster objects are selected as the k initial cluster centers from the data set X and denoted as $\{\mu_1, \mu_2, \ldots, \mu_k\}$, wherein $1 < k \le n$;

step 4.1.2: computing a Euclidean distance from each cluster object of n cluster objects to each initial cluster center of the k initial cluster centers according to the following formula, and assigning the each cluster object to a closest cluster:

$$d_{ij} = \sqrt{\sum_{t=1}^{m}(X_{it} - \mu_{jt})^2}$$

wherein $d_{ij}$ represents a Euclidean distance from an object $X_i$ to a cluster center $\mu_j$, m represents a quantity of attributes in the data set X, $X_{it}$ represents a $t^{th}$ attribute of an $i^{th}$ object, $\mu_{jt}$ represents and a $t^{th}$ attribute of a $j^{th}$ cluster center, wherein $1 \leq t \leq m$; and comparing the Euclidean distance from the each cluster object to the each initial cluster center successively, and assigning the each cluster object to the closest cluster, wherein a cluster center of the closest cluster is closest;

step 4.1.3: re-computing the each cluster center, wherein an average value of objects in each cluster of the k clusters is computed as a new cluster center according to the following formula:

$$\mu'_j = \frac{1}{|C_j|} \sum_{X_i \in C_j} X_i$$

wherein $\mu_j'$ represents a $j^{th}$ re-computed cluster center, $C_j$ represents a $j^{th}$ cluster, and $|C_j|$ represents a quantity of objects in the $j^{th}$ cluster; and step 4.1.4: determining whether the new cluster center has changed, wherein a sum of a distance from the each cluster object to each new cluster center is computed according to the following formula:

$$E = \sum_{j=1}^{k} \sum_{i=1}^{n} \|X_i - \mu'_j\|^2$$

wherein E represents the sum of the distance from the each cluster object to the each new cluster center, and is also referred to as a criterion function; steps 4.1.2 to 4.1.4 are repeated until the new cluster center does not change, that is, the criterion function converges, and then an iteration ends; and finally, convergent cluster centers are used as the classification indexes of the input values of the fuzzy logic model.

7. The edge computing-based method for the fine determination of the urban traffic state according to claim 1, wherein in step 5, based on a characteristic that the edge nodes at the intersections are interconnected, the traffic state of the remaining road segment is determined by linking information collected at an upstream intersection and the downstream intersection by the edge nodes in combination with results obtained in steps 1 to 4.

* * * * *